United States Patent
Morton et al.

(10) Patent No.: US 11,625,304 B2
(45) Date of Patent: Apr. 11, 2023

(54) EFFICIENT METHOD TO FIND CHANGED DATA BETWEEN INDEXED DATA AND NEW BACKUP

(71) Applicant: EMC IP Holding Company LLC, Hopkinton, MA (US)

(72) Inventors: James Morton, Adamstown, MD (US); Lihui Su, Shanghai (CN); Yubing Zhang, Shanghai (CN); Ming Zhang, Shanghai (CN); Yujun Liang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 915 days.

(21) Appl. No.: 16/396,518

(22) Filed: Apr. 26, 2019

(65) Prior Publication Data

US 2020/0341854 A1 Oct. 29, 2020

(51) Int. Cl.
*G06F 11/14* (2006.01)
*G06F 16/953* (2019.01)
*G06F 9/455* (2018.01)

(52) U.S. Cl.
CPC ...... *G06F 11/1451* (2013.01); *G06F 9/45558* (2013.01); *G06F 11/1469* (2013.01); *G06F 16/953* (2019.01); *G06F 11/1453* (2013.01)

(58) Field of Classification Search
CPC ............... G06F 11/1451; G06F 16/953; G06F 9/45558; G06F 11/1469; G06F 11/1453
See application file for complete search history.

(56) References Cited

U.S. PATENT DOCUMENTS

| | | | | |
|---|---|---|---|---|
| 8,099,605 | B1* | 1/2012 | Billsrom | G06F 11/1448 |
| | | | | 713/187 |
| 8,346,731 | B1* | 1/2013 | Tsaur | G06F 16/2228 |
| | | | | 707/673 |
| 8,676,759 | B1* | 3/2014 | Zhu | G06F 3/0617 |
| | | | | 707/638 |
| 9,135,118 | B2* | 9/2015 | Skillcorn | G06F 16/128 |
| 9,152,686 | B2* | 10/2015 | Whitehead | G06F 11/1469 |
| 9,448,893 | B1* | 9/2016 | Whitehead | G06F 16/1734 |
| 9,535,797 | B1* | 1/2017 | Feeser | G06F 3/065 |
| 10,311,021 | B1* | 6/2019 | Pillai | G06F 16/137 |
| 2010/0262797 | A1* | 10/2010 | Rosikiewicz | G06F 16/10 |
| | | | | 711/E12.001 |
| 2011/0016093 | A1* | 1/2011 | Clark | G06F 11/1453 |
| | | | | 711/E12.001 |

(Continued)

*Primary Examiner* — Huawen A Peng
(74) *Attorney, Agent, or Firm* — Womble Bond Dickinson (US) LLP

(57) ABSTRACT

An apparatus, method, and system for updating a file index in a search engine in a data backup system to reflect file changes introduced in a new backup is disclosed. The operations comprise: generating a first external file, the first external file comprising file hashes for files already indexed in a file index in a search engine of a data backup storage system that are not associated with a deleted status; generating a second external file, the second external file comprising file hashes for files in a new backup; determining one or more file changes introduced in the new backup based on a comparison between the first external file and the second external file; and updating the file index in the search engine to reflect the one or more file changes introduced in the new backup.

21 Claims, 8 Drawing Sheets

(56) References Cited

U.S. PATENT DOCUMENTS

| | | | | |
|---|---|---|---|---|
| 2012/0017114 | A1* | 1/2012 | Timashev | G06F 11/1458 |
| | | | | 714/15 |
| 2012/0084261 | A1* | 4/2012 | Parab | G06F 11/1458 |
| | | | | 707/674 |
| 2013/0110783 | A1* | 5/2013 | Wertheimer | G06F 11/1469 |
| | | | | 707/649 |
| 2015/0261776 | A1* | 9/2015 | Attarde | G06F 3/0641 |
| | | | | 707/664 |
| 2015/0309882 | A1* | 10/2015 | Harrison | G06F 16/27 |
| | | | | 707/645 |
| 2016/0077925 | A1* | 3/2016 | Tekade | G06F 3/067 |
| | | | | 707/654 |
| 2017/0068601 | A1* | 3/2017 | Nallathambi | G06F 16/128 |
| 2019/0188085 | A1* | 6/2019 | Slater | G06F 3/0608 |
| 2019/0294509 | A1* | 9/2019 | Bharadwaj | G06F 11/1451 |
| 2019/0340082 | A1* | 11/2019 | Pradhan | G06F 11/1464 |

* cited by examiner

| | Process count | Duration (min) | Average Index Rate (/sec) |
|---|---|---|---|
| Avamar File System | | | |
| One Node | 318,750,138 | 1,179 | 4,507 |
| Two Nodes | 321,286,510 | 516 | 10,377 |
| Three Nodes | 316,214,348 | 412 | 12,795 |
| Avamar NDMP | | | |
| One Node | 73,298,975 | 280 | 4,359 |
| Two Nodes | 76,471,265 | 269 | 4,731 |
| Three Nodes | 76,018,065 | 265 | 4,786 |
| Avamar VM | | | |
| One Node | 293,336,349 | 2,177 | 2,246 |
| Two Nodes | 314,444,245 | 1,404 | 3,732 |
| Three Nodes | 315,259,111 | 1,232 | 4,265 |
| Networker File System | | | |
| One Node | 408,469,182 | 2,884 | 2,361 |
| Two Nodes | 391,341,676 | 2,057 | 3,171 |
| Three Nodes | 381,423,032 | 1,815 | 3,503 |

EFFICIENT METHOD TO FIND CHANGED DATA BETWEEN INDEXED DATA AND NEW BACKUP

FIELD OF THE INVENTION

Embodiments of the present invention relate generally to data storage systems. More particularly, embodiments of the invention relate to data indexing in a data backup storage system.

BACKGROUND

In a typical data protection scenario, backups are scheduled against the same target. Examples of such backups may include: 1) Backing up the same folder set according to scheduled policies that run daily, or 2) Backing up a Network Data Management Protocol (NDMP) device according to scheduled policies that run weekly. All files of these scheduled backups need to be indexed, so that they are available for search.

There are challenges associated with indexing backed up files. Backups can be very large. For example, if a customer wants to back up a whole NDMP device, one backup could contain as many as 500 million files. As backups are typically generated daily, all files in each of these large backups need to be indexed. It can be inefficient to index all files of all backups, as such indexing requires too many system resources, and there can be a large number of duplicates. Therefore, the general solution involves indexing only unique files and providing an effective way to map files to backups. Accordingly, when indexing files of a new backup, the first goal is to determine which files have already been indexed, and which previously existing files have been removed from the new backup.

An existing solution relies on an underlying indexing engine of the search engine (e.g., Elasticsearch) to avoid indexing duplicate files. For example, when Elasticsearch is used as the search engine, a unique hash identifier (id) is generated for each file, the existing solution uses a unique hash identifier (id) generated for each file as the Elasticsearch document identifier. Elasticsearch provides the ability to ensure that files with the same document identifier can only be ingested once into the index.

This existing solution relies on Elasticsearch, but Elasticsearch has a serious performance issue when hash-based identifiers are used. As more and more documents are ingested into the index, performance degrades significantly.

BRIEF DESCRIPTION OF THE DRAWINGS

Embodiments of the invention are illustrated by way of example and not limitation in the figures of the accompanying drawings in which like references indicate similar elements.

FIG. 5 is a diagram illustrating backup file indexing performance according to embodiments.

DETAILED DESCRIPTION

Figure 1:
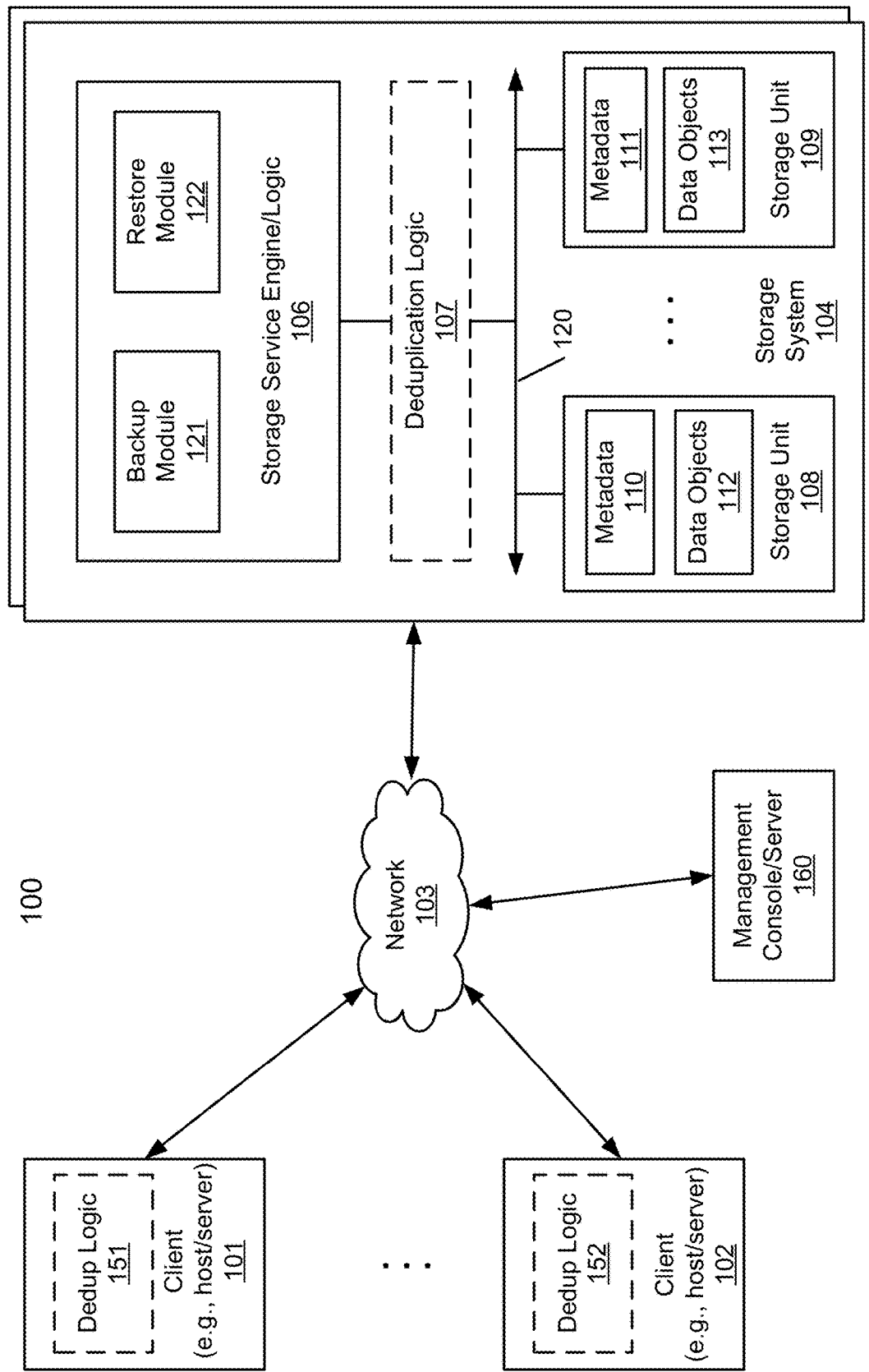
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to an apparatus, method, and system for updating a file index in a search engine in a data backup system to reflect file changes introduced in a new backup. A first external file may be generated, the first external file comprising file hashes for files already indexed in a file index in a search engine of a data backup storage system that are not associated with a deleted status. A second external file may be generated, the second external file comprising file hashes for files in a new backup. One or more file changes introduced in the new backup may be determined based on a comparison between the first external file and the second external file. Thereafter, the file index in the search engine may be updated to reflect the one or more file changes introduced in the new backup.

In one embodiment, the new backup is associated with a backup target indicative of a source of the new backup, and only file hashes for already-indexed files that are associated with the same backup target are included in the first external file.

In one embodiment, the backup target comprises a directory name or a virtual machine (VM) name.

In one embodiment, a file hash for each file is calculated based on a combination of a backup server identifier, a backup identifier, a file full path, and a time of last modification associated with the file.

In one embodiment, the one or more file changes introduced in the new backup comprise one or more files newly added in the new backup, one or more files that have been deleted in the new backup, or a combination thereof.

In one embodiment, updating the file index in the search engine to reflect the one or more file changes comprises adding one entry to the file index for each of the one or more files newly added in the new backup and/or associating a respective entry for each of the one or more files that have been deleted in the new backup with a deleted status.

In one embodiment, the file hashes in the first and second external files are sorted based on their values before determining the one or more file changes.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2A:
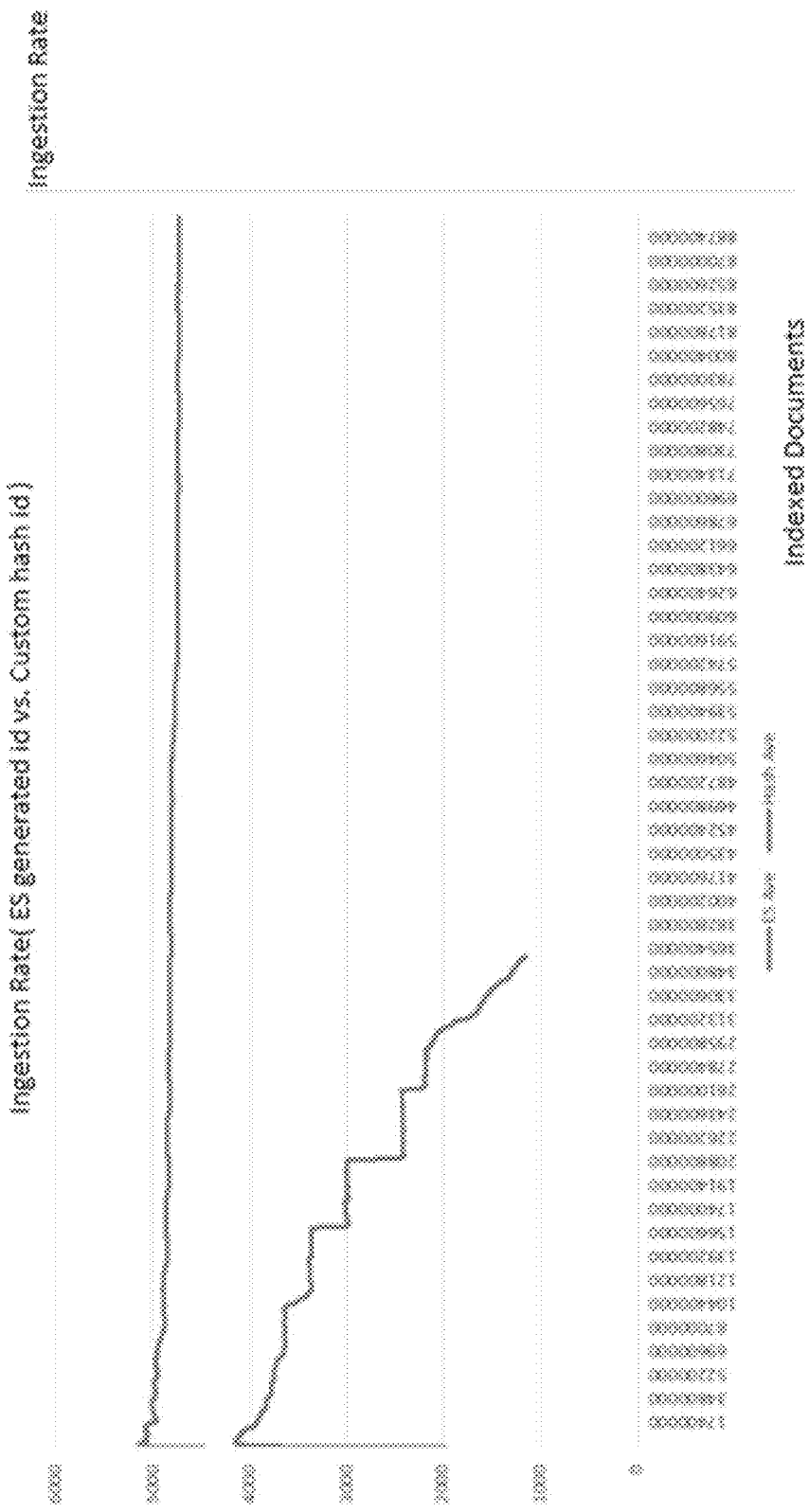
FIGS. 2A and 2B are diagrams illustrating performance issues related to using hash-based document identifiers with the indexing engine of Elasticsearch.
Figure 2B:
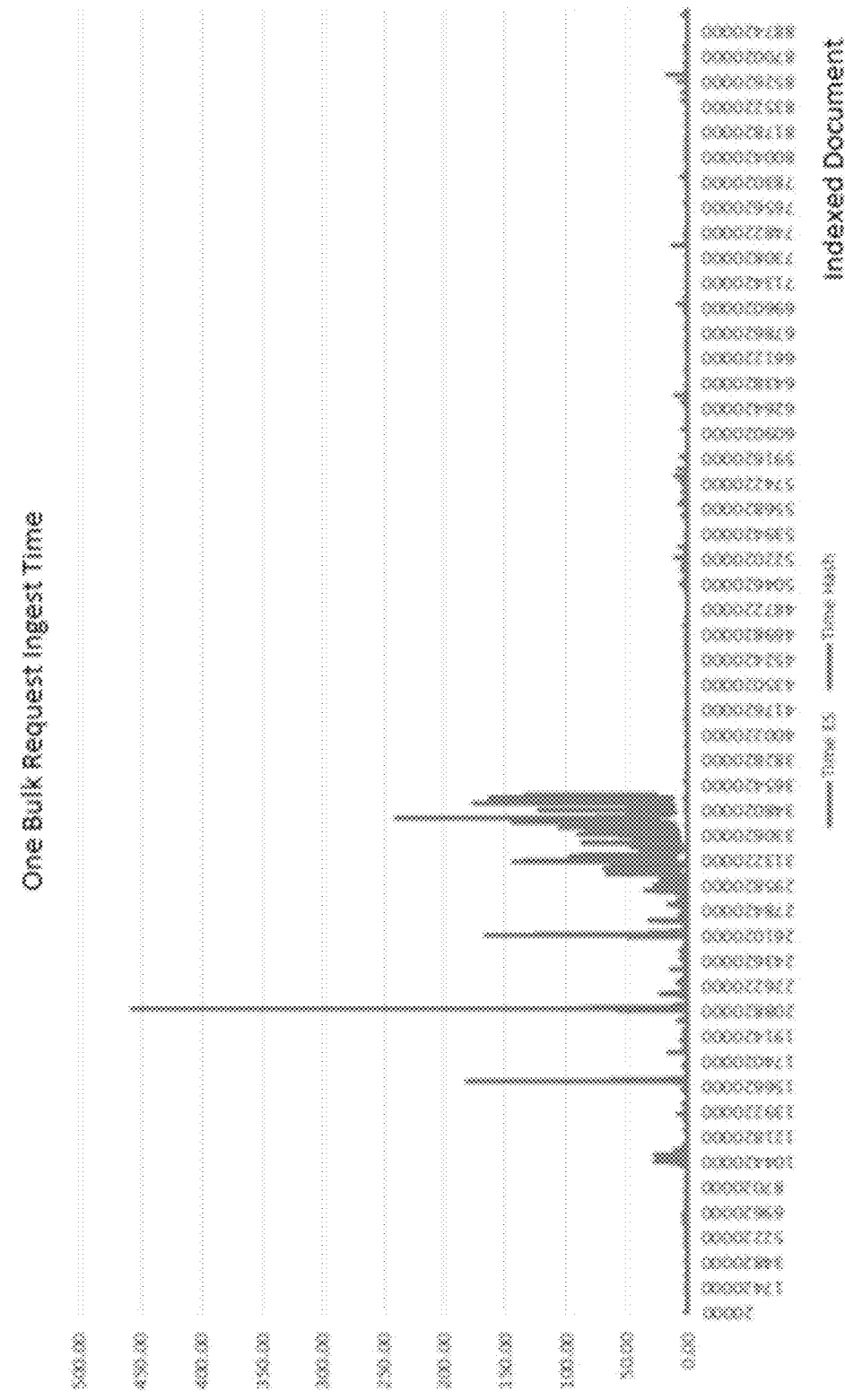

Referring to FIGS. 2A and 2B, diagrams 200A, 200B illustrating performance issues related to using hash-based document identifiers with the indexing engine of Elasticsearch are shown. FIG. 2A, which shows average ingestion speeds, shows that the ingestion speed associated with using hash-based document identifiers starts about 20% slower than the ingestion speed associated with using native Elasticsearch-generated identifiers. But over time, as the number of files increases, the ingestion speed associated with using hash-based document identifiers very rapidly drops.

FIG. 2B shows the amount of time it takes to index a 10,000-item bulk file. When native Elasticsearch-generated identifiers are used, the amount of time stays fairly consistently below one second (with only brief small spikes), even as the total number of items in the index increases. However, when hash-based identifiers are used, the amount of time quickly begins to encounter spikes stretching into minutes for the same operation. As the index approaches 3 million items in size, the spikes associated with using hash-based identifiers become the norm, and the ingestion speed is reduced to a crawl.

In one embodiment, the search engine (e.g., Elasticsearch) is not used to avoid indexing duplicate files. Thus, the search engine do not need to use hash-based identifiers as document identifiers. The differences between data that has been indexed with previous backups and data in a new backup may be determined independently from the search engine. Only changed data is then imported into the search engine for indexing. As the hash-based identifiers are not used as document identifiers of the search engine, the performance issue described in detail above can be resolved. In one embodiment, a memory controllable way may be used to determine the differences, thus accommodating the potentially large size of the backup.

In one embodiment, when ingesting files, the c (e.g., Elasticsearch) is configured to generate native document identifiers for the files. For each file ingested, a unique file hash is also written to the search engine: the file hash may be calculated based on a combination of a backup server identifier, a backup identifier, a file full path, and a time of last modification associated with the file. Any suitable hashing algorithm, such as MD5, or others, may be used in the calculation of the file hash.

In one embodiment, each of the indexed files is also assigned in the search engine with a property indicative of a backup target (hereinafter the property may be simply referred to as Backup Target). The Backup Target property identifies the source of the file (a folder name or a virtual machine "VM" name). In one embodiment, files in the new backup are compared against only the already-indexed data that has the same Backup Target. This is to exploit the fact that the most duplication is found in the backup sequence associated with a same Backup Target.

Assume the new backup is a backup of a folder named "MyFolder." In other words, the Backup Target property is "MyFolder." The hashes of existing already-indexed files from the same backup target may be read from the search engine (e.g., Elasticsearch) with the query: Backup Target="MyFolder" and Status !="deleted" (that is, the Backup Target property associated with the file is "MyFolder" and the status of the file indicates the file has not been deleted). The query operation may use a memory-efficient scroll query method.

The file hashes obtained from the query may be exported to a first external file (e.g., "lastbackup.txt") (external to the search engine) and sorted by the values of the hashes. An external (to the search engine) sorting method (e.g., with a merge sort algorithm) may be used to control memory usage. The file metadata from the new backup is read, and a hash generated for each file based on the above-described hashing scheme. The hashes and the metadata (name, path, last modified time, etc.) are stored in a second external file (e.g., "newbackup.txt") and sorted by values of the hashes.

The hashes in the first and the second external files are compared. In particular, the two external files may be read in chunks. If a hash exists in the second external file but does not exist in the first external file, then the corresponding file is a newly added file that has not been indexed. If a hash exists in the first external file but does not exist in the second external file, then the file has been deleted in the new backup.

The newly added files thus identified are then ingested into the search engine. Status for the files that are identified as having been deleted in the new backup can be changed to "deleted."

If there are additional new backups to be processed, the second external file may be renamed to serve as a first external file (e.g., renaming "newbackup.txt" to "lastbackup.txt") for the processing of the next new backup. The operations comprising generating a new second external file, comparing the two external files, updating the index in the search engine, and renaming the second external file may be repeated until all new backups have been processed.

Figure 3:
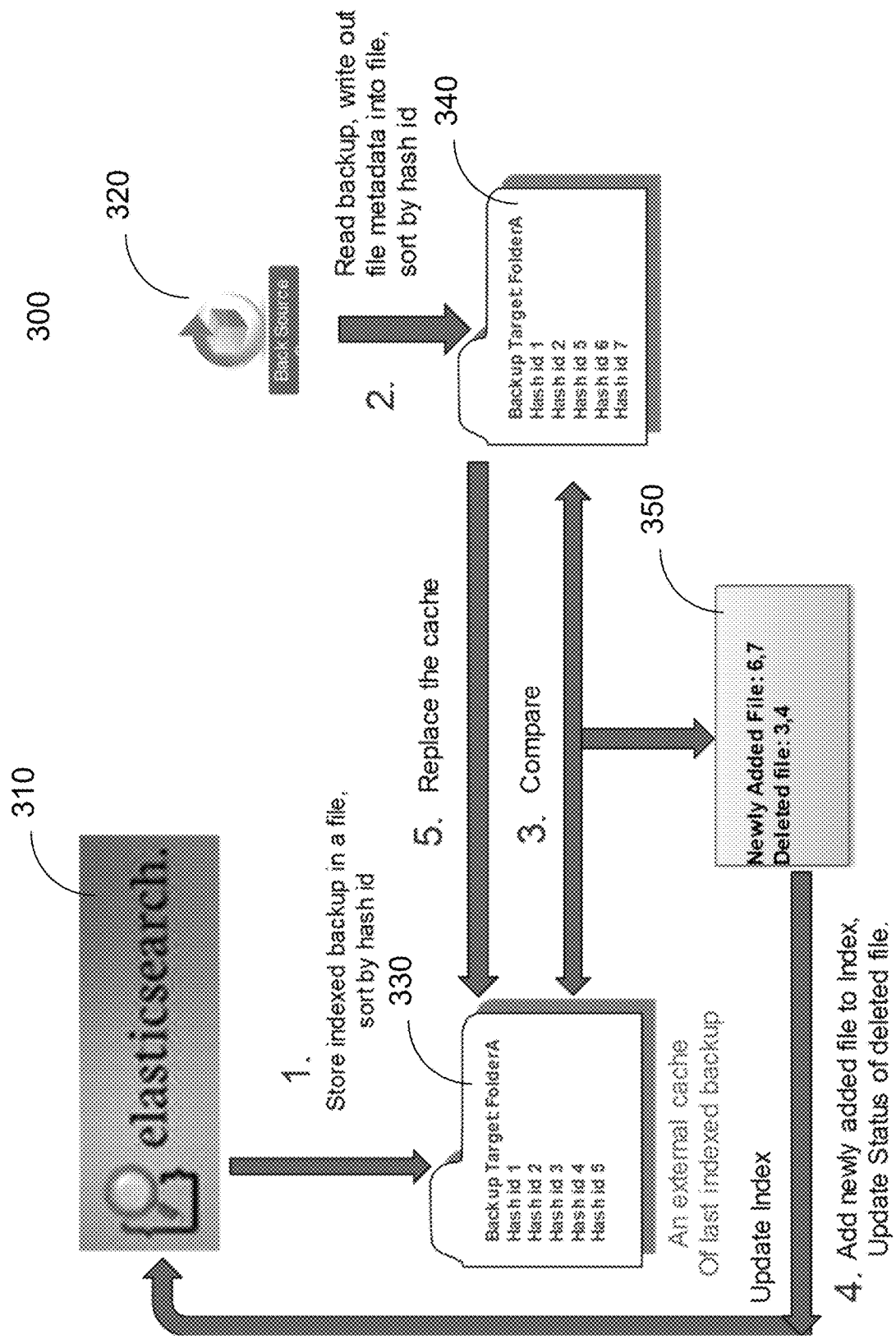
FIG. 3 is a diagram illustrating an example method for updating a file index in a search engine based on a new backup according to one embodiment.

Referring to FIG. 3, a diagram 300 illustrating an example method for updating a file index in a search engine based on a new backup according to one embodiment is shown. The hashes of existing already-indexed files from the same backup target may be read from the search engine (e.g., Elasticsearch) 310, as described in detail above. The file hashes obtained from the query may be exported to a first external file (cache) 330 and sorted by the values of the hashes. The file metadata from the new backup 320 is read, and a hash generated for each file based on the above-described hashing scheme. The hashes and the metadata (name, path, last modified time, etc.) are stored in a second external file (cache) 340 and sorted by the values of the hashes.

The hashes in the first external cache 330 and in the second external cache 340 are compared. If a hash exists in the second external file but does not exist in the first external file, then the corresponding file is a newly added file that has not been indexed. If a hash exists in the first external file but does not exist in the second external file, then the file has been deleted in the new backup. Thus, at block 350, files 6 and 7 have been identified as newly added files from the new backup 320, and files 3 and 4 have been identified as having been deleted in the new backup 320.

The newly added files thus identified are then ingested into the search engine. Status for the files that are identified as having been deleted in the new backup 320 can be changed to "deleted."

If there are additional new backups to be processed, the second external cache may be renamed to serve as a first external cache for the processing of the next new backup. The operations comprising generating a new second external cache base on the next new backup, comparing the two external caches, updating the index in the search engine, and renaming the second external cache may be repeated until all new backups have been processed.

Figure 4:
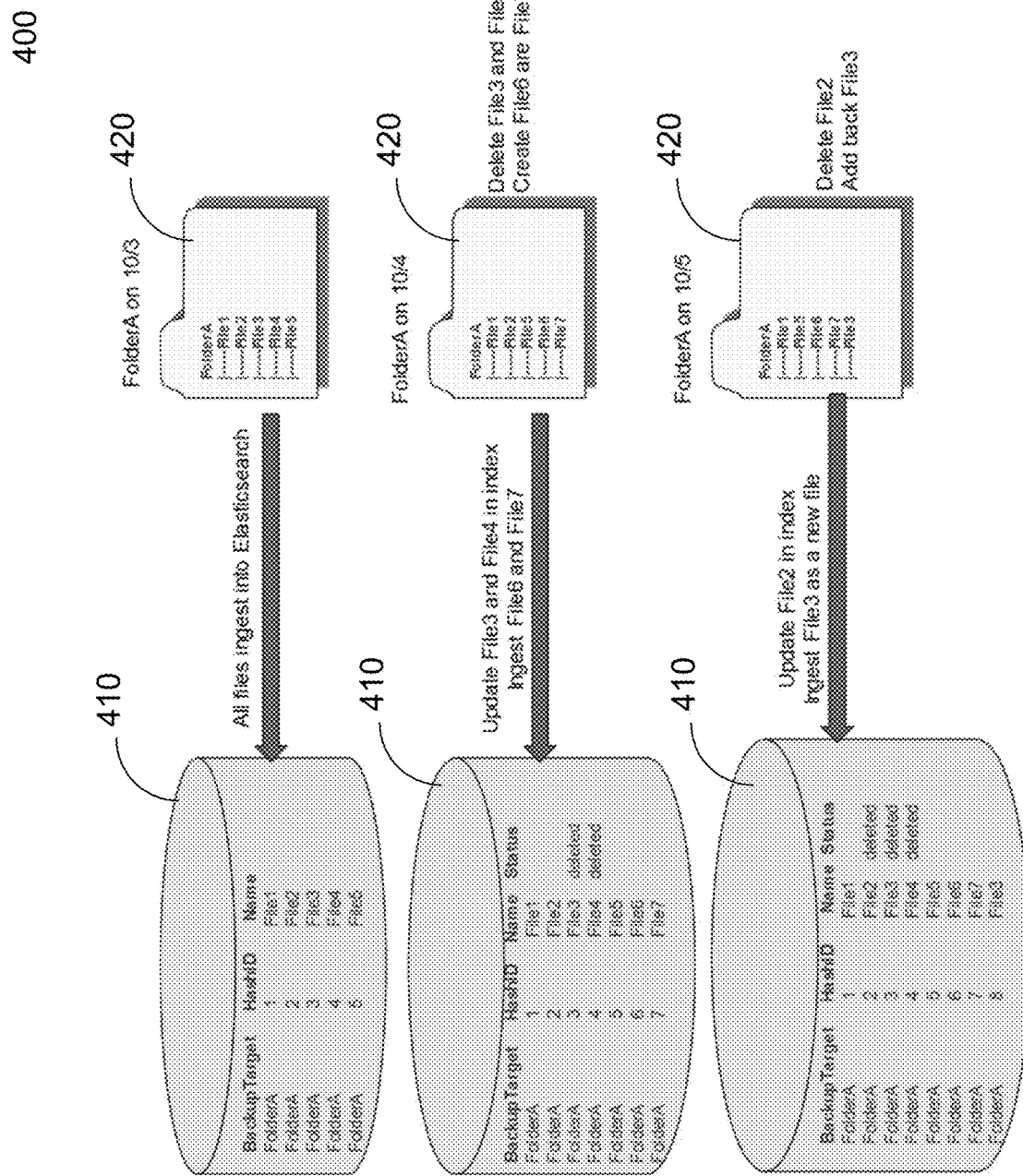
FIG. 4 is a diagram illustrating index updates in the search engine based on daily backups according to one embodiment.

Referring to FIG. 4, a diagram 400 illustrating index updates in the search engine based on daily backups according to one embodiment is shown. As illustrate in FIG. 4, the relevant Backup Target here is the folder "FolderA" 420. On October 3, a first backup of the folder "FolderA" 420 comprising files "File1" through "File5" is created. As all five files are newly added, they are all ingested into the search engine 410 for indexing. Thereafter, before performing the daily backup of the folder "FolderA" 420 on October 4, files "File3" and "File4" have been deleted from the folder 420, and files "File6" and "File7" have been newly added to the folder 420. Thus, after performing the backup of the folder "FolderA" 420 on October 4, these data changes in the new daily backup are determined using the operations described in detail above. The file index in the search engine 410 is updated accordingly. In particular, new entries are created for files "File6" and "File7," and the status associated with files "File3" and "File4" is changed to "deleted."

Furthermore, before performing the daily backup of the folder "FolderA" 420 on October 5, the file "File2" has been deleted from the folder 420, and the file "File3" has been re-added to the folder 420. Thus, after performing the backup of the folder "FolderA" 420 on October 5, these data changes in the new daily backup are determined using the operations described in detail above. It should be appreciated that the re-added file "File3" is simply identified as a newly added file distinct from the previously deleted file "File3, even though their contents may be the same, because they have different file hashes as a result of having different backup identifiers and different times of last modification. The file index in the search engine 410 is then updated accordingly. In particular, a new entry is created for the re-added file "File3," and the status associated with the file "File2" is changed to "deleted."

It should be appreciated that because the time of last modification is used in the calculation of the file hash, a file content change will be treated as deletion of the original file and addition of a new file. It should be further appreciated that when a file is already indexed, but is not found in a new backup, the index entry is updated with a status of "deleted". If a previously-deleted file is added back in another backup, the file would have a new time of last modification. Therefore even if re-added file has the same content, it will be indexed as a new file distinct from the previously-deleted file.

Furthermore, if a file's content is updated, the time of last modification would also change. Therefore the update of file content will be treated as deletion of the old version of the file (with the status of the entry in the index updated to reflect the "deleted" status), and addition of the new version of the file as a new file (with a new entry in the index).

Referring to FIG. 5, a diagram 500 illustrating backup file indexing performance according to embodiments is shown. As can be seen in FIG. 5, when up to 400 million items are processed with a duration of up to 40 hours, the index rate is stable at around 4000 items per second with no perceptible performance degradation as the size of the index increases. This represents a significant improvement over the previous existing solution, where the index rate drops to 1000 items per second after ingesting just 3 million items into the search engine.

Figure 6:
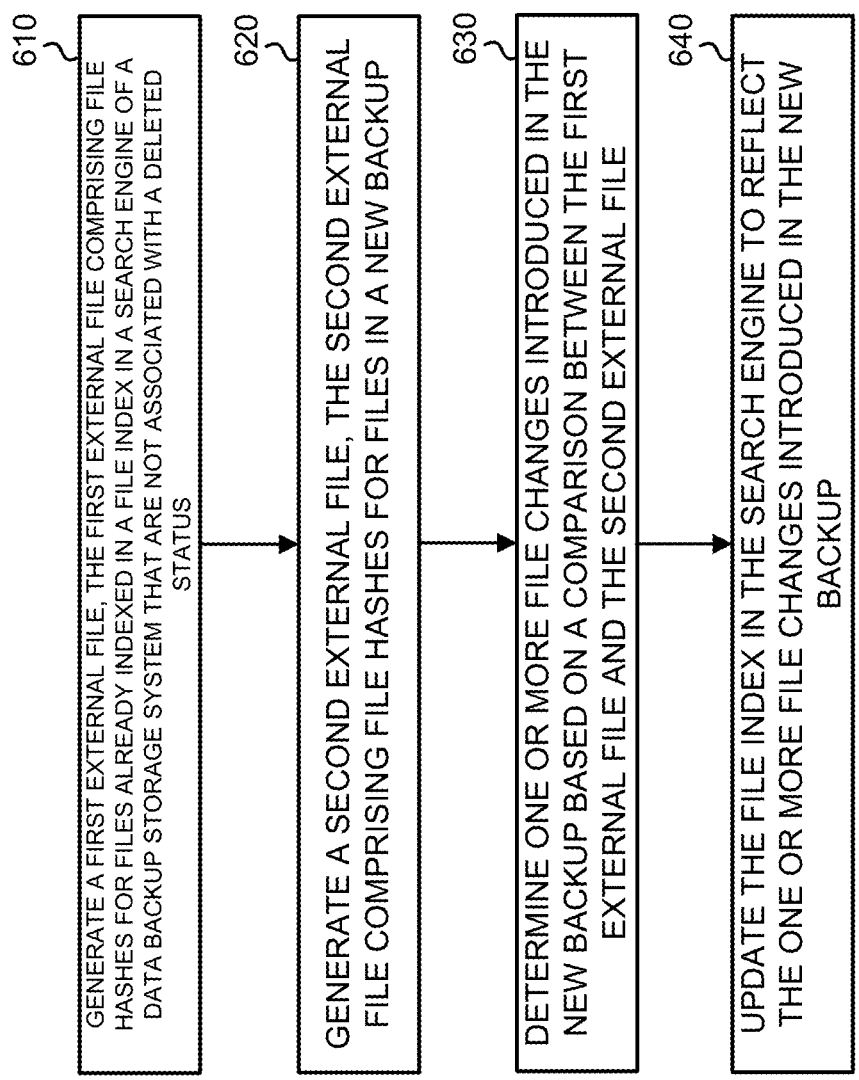
FIG. 6 is a flow diagram illustrating a process of updating a file index in a search engine in a data backup system to reflect file changes introduced in a new backup according to one embodiment of the disclosure.

FIG. 6 is a flow diagram illustrating a process 600 of updating a file index in a search engine in a data backup system to reflect file changes introduced in a new backup according to one embodiment of the disclosure. Process 600 may be performed by processing logic that includes hardware (e.g. circuitry, dedicated logic, etc.), software (e.g., embodied on a non-transitory computer readable medium), or a combination thereof. For example, process 600 may be performed by processors 1501 of FIG. 7. Referring to FIG. 6, at block 610, a first external file may be generated, the first external file comprising file hashes for files already indexed in a file index in a search engine of a data backup storage system that are not associated with a deleted status. At block 620, a second external file may be generated, the second external file comprising file hashes for files in a new backup. At block 630, one or more file changes introduced in the new backup may be determined based on a comparison between the first external file and the second external file. At block 640, the file index in the search engine may be updated to reflect the one or more file changes introduced in the new backup.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
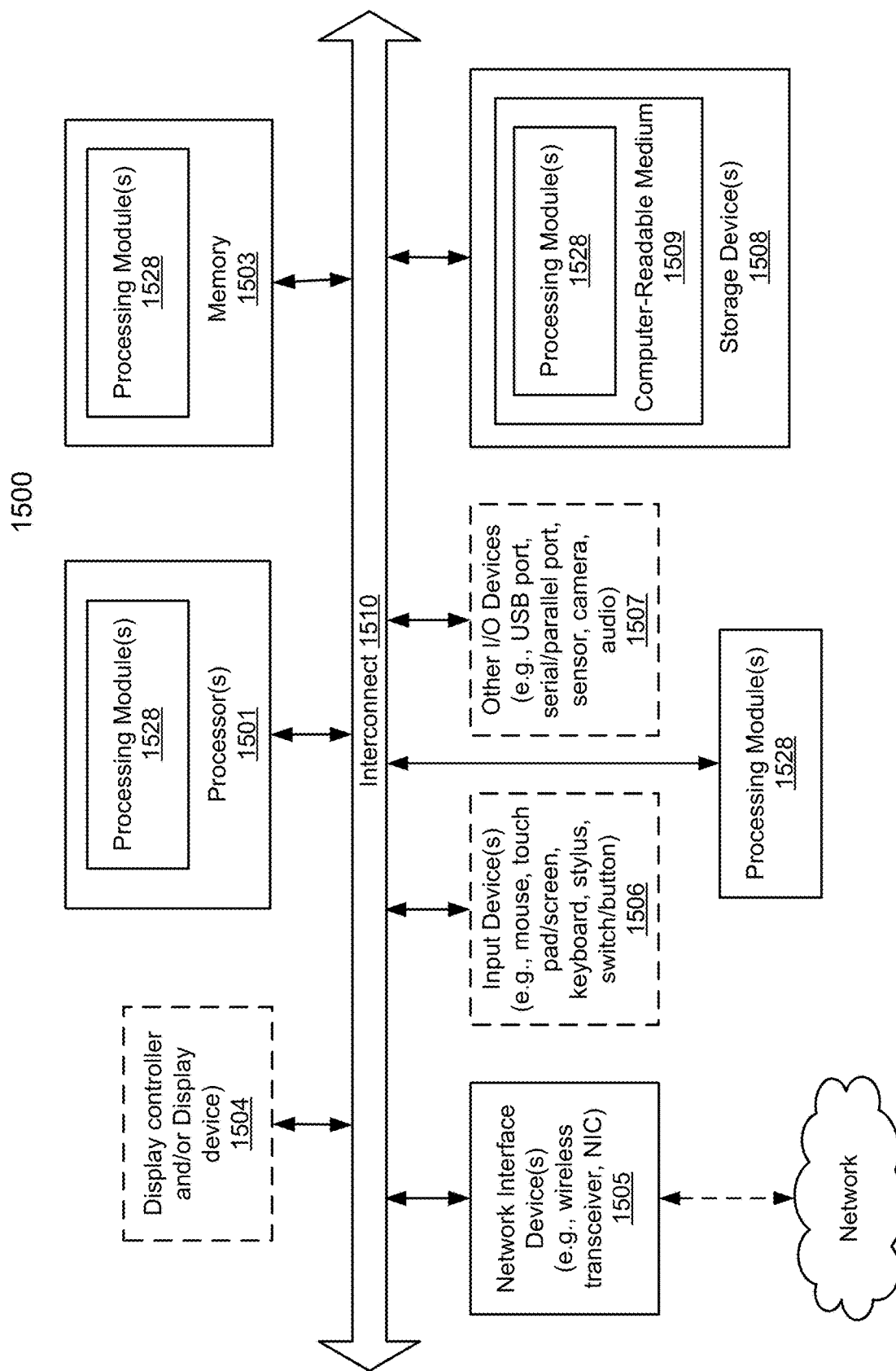
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a search engine, a hashing module, a sorting module, a comparing module, as described above. Processing module/unit/ logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
generating a first external file, the first external file comprising file hashes for files already indexed in a file index in a search engine of a data backup storage system that are not associated with a deleted status;
generating a second external file, the second external file comprising file hashes for files in a new backup;
determining one or more file changes introduced in the new backup based on a comparison between the file hashes in the first external file and the file hashes in the second external file; and
updating the file index in the search engine to reflect the one or more file changes introduced in the new backup.

2. The method of claim 1, wherein the new backup is associated with a backup target indicative of a source of the new backup, and only file hashes for already-indexed files that are associated with the same backup target are included in the first external file.

3. The method of claim 2, wherein the backup target comprises a directory name or a virtual machine (VM) name.

4. The method of claim 1, wherein a file hash for each file is calculated based on a combination of a backup server identifier, a backup identifier, a file full path, and a time of last modification associated with the file.

5. The method of claim 1, wherein the one or more file changes introduced in the new backup comprise one or more files newly added in the new backup, one or more files that have been deleted in the new backup, or a combination thereof.

6. The method of claim 5, wherein updating the file index in the search engine to reflect the one or more file changes comprises performing at least one of adding one entry to the file index for each of the one or more files newly added in the new backup or associating a respective entry for each of the one or more files that have been deleted in the new backup with a deleted status.

7. The method of claim 1, wherein the file hashes in the first and second external files are sorted based on their values before determining the one or more file changes.

8. A non-transitory machine-readable medium having instructions stored therein, which when executed by a processor, cause the processor to perform data indexing operations, the operations comprising:
generating a first external file, the first external file comprising file hashes for files already indexed in a file index in a search engine of a data backup storage system that are not associated with a deleted status;
generating a second external file, the second external file comprising file hashes for files in a new backup;
determining one or more file changes introduced in the new backup based on a comparison between the file hashes in the first external file and the file hashes in the second external file; and
updating the file index in the search engine to reflect the one or more file changes introduced in the new backup.

9. The non-transitory machine-readable medium of claim 8, wherein the new backup is associated with a backup target indicative of a source of the new backup, and only file hashes for already-indexed files that are associated with the same backup target are included in the first external file.

10. The non-transitory machine-readable medium of claim 9, wherein the backup target comprises a directory name or a virtual machine (VM) name.

11. The non-transitory machine-readable medium of claim 8, wherein a file hash for each file is calculated based on a combination of a backup server identifier, a backup identifier, a file full path, and a time of last modification associated with the file.

12. The non-transitory machine-readable medium of claim 8, wherein the one or more file changes introduced in the new backup comprise one or more files newly added in the new backup, one or more files that have been deleted in the new backup, or a combination thereof.

13. The non-transitory machine-readable medium of claim 12, wherein updating the file index in the search engine to reflect the one or more file changes comprises performing at least one of adding one entry to the file index for each of the one or more files newly added in the new backup or associating a respective entry for each of the one or more files that have been deleted in the new backup with a deleted status.

14. The non-transitory machine-readable medium of claim 8, wherein the file hashes in the first and second external files are sorted based on their values before determining the one or more file changes.

15. A data processing system, comprising:
a processor; and
a memory coupled to the processor to store instructions, which when executed by the processor, cause the processor to perform data storage operations, the operations including:
generating a first external file, the first external file comprising file hashes for files already indexed in a file index in a search engine of a data backup storage system that are not associated with a deleted status;
generating a second external file, the second external file comprising file hashes for files in a new backup;
determining one or more file changes introduced in the new backup based on a comparison between the file hashes in the first external file and the file hashes in the second external file; and
updating the file index in the search engine to reflect the one or more file changes introduced in the new backup.

16. The data processing system of claim 15, wherein the new backup is associated with a backup target indicative of a source of the new backup, and only file hashes for already-indexed files that are associated with the same backup target are included in the first external file.

17. The data processing system of claim 16, wherein the backup target comprises a directory name or a virtual machine (VM) name.

18. The data processing system of claim 15, wherein a file hash for each file is calculated based on a combination of a backup server identifier, a backup identifier, a file full path, and a time of last modification associated with the file.

19. The data processing system of claim 15, wherein the one or more file changes introduced in the new backup comprise one or more files newly added in the new backup, one or more files that have been deleted in the new backup, or a combination thereof.

20. The data processing system of claim 19, wherein updating the file index in the search engine to reflect the one or more file changes comprises performing at least one of adding one entry to the file index for each of the one or more files newly added in the new backup or associating a respective entry for each of the one or more files that have been deleted in the new backup with a deleted status.

21. The data processing system of claim 15, wherein the file hashes in the first and second external files are sorted based on their values before determining the one or more file changes.

* * * * *